UNITED STATES PATENT OFFICE.

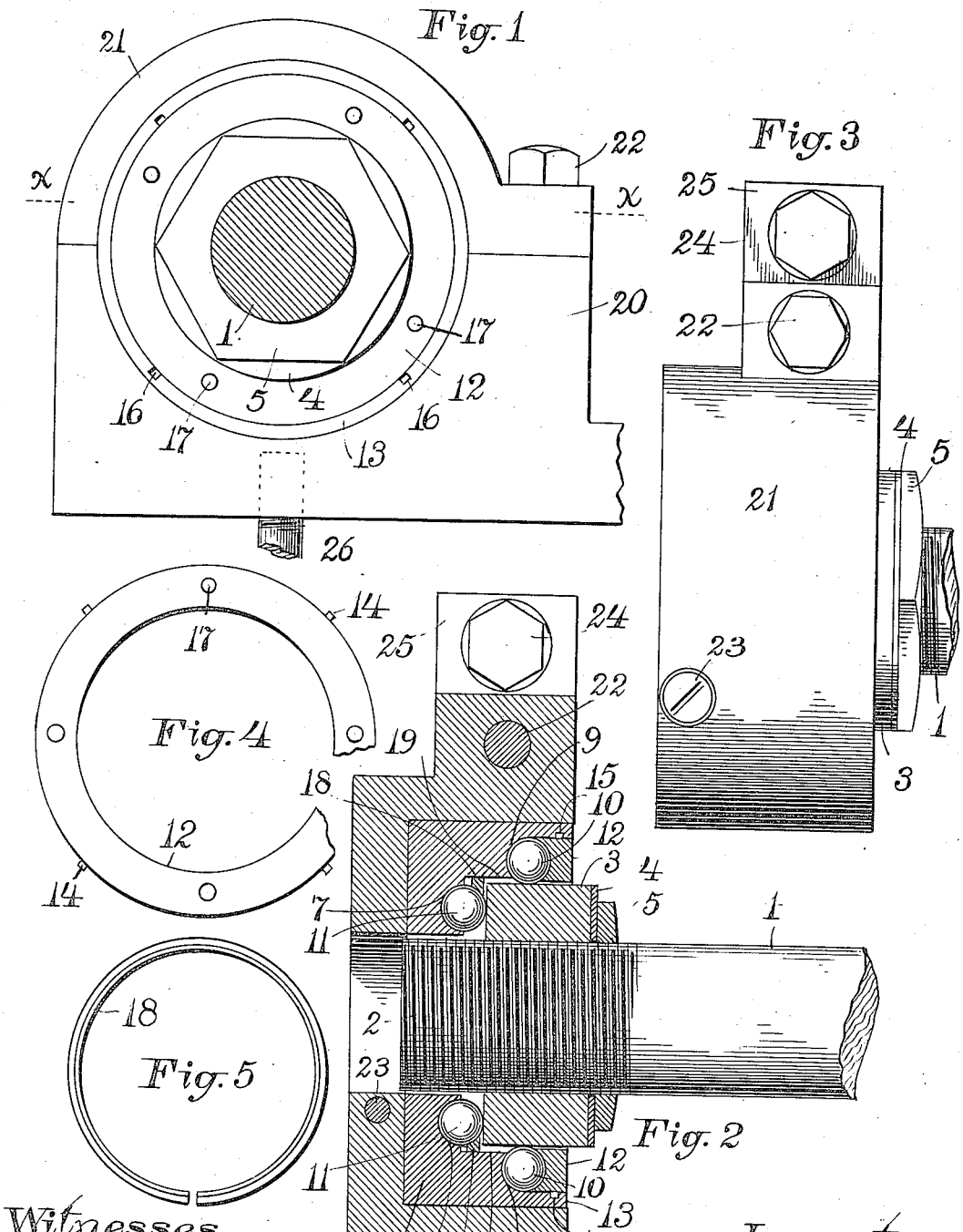

MIKARL A. SCUTERUD, OF ARLINGTON HEIGHTS, MASSACHUSETTS, ASSIGNOR TO CHORALCELO MANUFACTURING COMPANY, OF BOSTON, MASSACHUSETTS, A CORPORATION.

BALL-BEARING.

1,156,320.    Specification of Letters Patent.    Patented Oct. 12, 1915.

Application filed October 20, 1910. Serial No. 588,114.

*To all whom it may concern:*

Be it known that I, MIKARL A. SCUTERUD, a citizen of the United States, and a resident of Arlington Heights, in the county of Middlesex and Commonwealth of Massachusetts, have invented certain new and useful Improvements in Ball-Bearings, of which the following is a specification.

This invention relates to ball bearings designed both for peripheral and longitudinal support of a shaft; and it pertains to the construction of such a bearing which shall be economical to manufacture, easy to adjust, and durable and effective in use.

Referring to the drawings forming part of this specification, Figure 1 is a face view of one of the bearings complete, with the shaft supported thereby being shown in cross section. Fig. 2 is a horizontal section of the same on the line X—X in Fig. 1. Fig. 3 is a plan view of the bearing. Fig. 4 is a face view of the locking ring for securing certain of the balls in place. Fig. 5 is a face view of the ring which locks the remaining balls in place.

The reference numeral 1 in the drawings designates the shaft for which the ball bearings are designed, said shaft being preferably threaded at each end, as at 2, for firmly holding the internally threaded shoulder-ring 3 which provides the surfaces with which the ball bearings are to contact. The objects are two-fold in thus arranging said contact-surfaces, the first being to enable the same to be accurately hardened and ground, and the other being to provide longitudinal adjustment. For maintaining said ring in place, a washer 4 and check-nut 5 are provided, as shown in Figs. 1 and 2.

Referring to Fig. 2, it will be seen that the cup or block 6 is provided with two raceways or grooves 7 and 9, the latter of which is proportioned to hold the balls 10 in close peripheral contact with the ring 3, while the balls 11 in the raceway 7 are held against the flat face or end of said shoulder-ring. The balls 10 are held in place by the locking-ring 12 fitting within the rim or flange 13 which projects sufficiently beyond the raceway 9; said ring being fastened in position by means of small lugs 14 projecting from its outer periphery into the annular groove 15 in said rim 13; as shown in Fig. 4. To introduce said projections or lugs into said groove, notches 16 are formed in said rim, as shown in Fig. 1, the same corresponding in number and position with said lugs. Small holes 17 are provided in said ring by means of which to turn it after its lugs have passed through said notches into the groove 15, and to thereby lock it in place. The inner face of said ring is preferably concaved to fit more or less closely the balls 10. For retaining the balls 11 in place when the shaft and shoulder ring are not in position, a split spring ring 18 is pressed into the space inclosed by the wall 19, as shown in Fig. 2; Fig. 5 showing such split ring. The cup 6 is preferably cylindrical in outer contour, and is fitted in a box comprising the base 20 and top 21, as shown in Figs. 1 and 2; said parts being fastened together by the bolts 22 and screw 23. This box is attached to the supporting standard or base of the machine with which the same is used, by means of the bolt 24 passing through the lug 25, and the screw or bolt 26 tapped up from such standard into the base 20, as shown in Figs. 1 and 2.

Among other advantages of this construction of bearing is the end play permitted by the coaction of the cylindrical surface of the shoulder-ring with the balls 10, the end-thrust of the shaft being resisted by the balls 11 when the shaft reaches the terminations of the end-play permitted. This end-play is of great value for the armatures of electric motors, in order that the brushes engaging the commutators may not groove the latter.

What I claim as my invention and for which I desire Letters Patent, is as follows, to wit:—

1. A ball bearing comprising a shaft, a collar threaded upon said shaft and having a cylindrical periphery, a nut for securing said collar in place when adjusted, an integral cup having two raceways and balls therein, one raceway and its balls coacting with the end of said collar, and the other raceway and its balls coacting with the periphery of said collar, said cup having an annular groove and notches communicating therewith, and a locking ring having lugs adapted to pass through said notches into said groove.

2. A ball bearing comprising a shaft, a collar thereon having a cylindrical periphery, an integral cup having two raceways and balls therein, one raceway and its balls coacting with an end of said collar, and the other raceway and its balls coacting with the periphery of said collar, means for longitudinally adjusting said collar on said shaft, and means fitted within the mouth of said cup for preventing the escape of the balls from the last-named raceway.

3. A ball bearing comprising a shaft having a portion thereof threaded, a collar internally threaded to fit said threaded portion and having a flat end and a cylindrical periphery, an integral cup having two raceways and balls therein, one raceway and its balls coacting with said flat end, and the other raceway and its balls coacting with said periphery, a check nut on said threaded portion of the shaft for locking said collar in its adjusted positions, and means fitted within the mouth of said cup for preventing the escape of the last-mentioned balls.

In testimony that I claim the foregoing invention, I have hereunto set my hand this 17 day of October, 1910.

MIKARL A. SCUTERUD.

Witnesses:
   A. B. UPHAM,
   CHARLES GARRISON.